US012630296B2

(12) United States Patent     (10) Patent No.: US 12,630,296 B2
Bhatt                              (45) Date of Patent:       May 19, 2026

(54) HYBRID PROPULSION SYSTEM FOR AIRCRAFT

(71) Applicant: Jay Bhatt, Bryan, TX (US)

(72) Inventor: Jay Bhatt, Bryan, TX (US)

( * ) Notice: Subject to any disclaimer, the term of this patent is extended or adjusted under 35 U.S.C. 154(b) by 472 days.

(21) Appl. No.: 17/984,457

(22) Filed: Nov. 10, 2022

(65) Prior Publication Data

US 2024/0158090 A1    May 16, 2024

(51) Int. Cl.
| | |
|---|---|
| *B64D 27/357* | (2024.01) |
| *B64D 27/16* | (2006.01) |
| *B64D 27/33* | (2024.01) |
| *B64D 27/35* | (2024.01) |
| *B64D 35/022* | (2025.01) |
| *B64D 35/026* | (2025.01) |
| *B64C 27/12* | (2006.01) |
| *B64C 29/00* | (2006.01) |

(52) U.S. Cl.
CPC ........... *B64D 27/357* (2024.01); *B64D 27/16* (2013.01); *B64D 27/33* (2024.01); *B64D 27/35* (2024.01); *B64D 35/022* (2024.01); *B64D 35/026* (2024.01); *B64C 27/12* (2013.01); *B64C 29/0075* (2013.01)

(58) Field of Classification Search
CPC ...... B64D 27/33; B64D 27/35; B64D 27/357; B64D 35/022; B64D 35/026
See application file for complete search history.

(56) References Cited

U.S. PATENT DOCUMENTS

| | | | |
|---|---|---|---|
| 5,085,315 | A | 2/1992 | Sambell |
| 8,109,073 | B2 | 2/2012 | Foster et al. |
| 8,291,716 | B2 | 10/2012 | Foster et al. |
| 8,857,191 | B2 | 10/2014 | Hyde et al. |
| 9,038,367 | B2 | 5/2015 | Suciu et al. |
| 9,181,898 | B2 | 11/2015 | Bhatt |

(Continued)

FOREIGN PATENT DOCUMENTS

| | | |
|---|---|---|
| CA | 2963776 | 11/2017 |

OTHER PUBLICATIONS

Youtube Video Screenshot and Transcript: https://www.youtube.com/watch?v=AdCcbBhondA, "How Jet Engines Work/Part 1: Starting", Dated: Sep. 28, 2021, Retrieved from Internet on Aug. 1, 2023.

(Continued)

*Primary Examiner* — Richard Green
(74) *Attorney, Agent, or Firm* — FisherBroyles, LLP; Susan M. Oiler

(57) ABSTRACT

Hybrid propulsion integral systems for a fixed wing aircraft, and a V/STOL aircraft. A core of the jet engine rotates an integral generator, that provides current to charge batteries located in various locations on an aircraft. The batteries and generator are selectively used to power electric motor(s) that provide the sole source of torque (power) to fans, propellers, or rotors that propel the aircraft, along with a fuel operated gas turbine. In addition, for a V/STOL air vehicle, a hybrid propulsion system fixed to a wing or split between wing and empennage, with moving integral submodules, such as a multifunctional thrust vectoring exhaust nozzle and electrically operated tiltable propeller(s). These differ from the prior configurations by provisioning integrated architectures as delineated.

23 Claims, 11 Drawing Sheets

(56) References Cited

U.S. PATENT DOCUMENTS

| | | | | |
|---|---|---|---|---|
| 9,212,625 | B2 | 12/2015 | Shelley | |
| 10,378,452 | B1 | 8/2019 | Barmichev et al. | |
| 10,745,144 | B2 * | 8/2020 | Tweet | B64D 37/32 |
| 10,822,716 | B2 | 11/2020 | Kishi et al. | |
| 11,390,395 | B2 * | 7/2022 | Beall | H02K 7/003 |
| 11,566,567 | B2 * | 1/2023 | Kupratis | B64D 31/18 |
| 2010/0083632 | A1 * | 4/2010 | Foster | B64D 27/24 |
| | | | | 60/39.181 |
| 2010/0126178 | A1 | 5/2010 | Hyde et al. | |
| 2015/0100181 | A1 | 4/2015 | Strauss et al. | |
| 2017/0327219 | A1 * | 11/2017 | Alber | B64D 35/022 |
| 2020/0164992 | A1 | 5/2020 | Tamada et al. | |
| 2020/0231293 | A1 | 7/2020 | Parsons et al. | |
| 2021/0229821 | A1 | 7/2021 | Alt et al. | |
| 2022/0009644 | A1 | 1/2022 | Rabbi et al. | |
| 2022/0127969 | A1 * | 4/2022 | O'Neill | B64D 27/24 |
| 2022/0242557 | A1 | 8/2022 | Knoll et al. | |
| 2025/0128822 | A1 * | 4/2025 | Morrison | B64D 27/33 |

OTHER PUBLICATIONS

Youtube Video Screenshot and Transcript: https://www.youtube.com/watch?v=5LKq9mEvJbs,"How Jet Engines Work/Part 2: Outputs", Dated: Nov. 1, 2021, Retrieved from Internet on Aug. 1, 2023.

Youtube Video Screenshot and Transcript: https://www.youtube.com/watch?v=VNFzBKAv_9E, "How Jet Engines Work/Part 3: Performance", Dated: Nov. 28, 2021, Retrieved from Internet on Aug. 1, 2023.

Youtube Video Screenshot and Transcript: https://www.youtube.com/watch?v=r9qm1xKZm1w, "How Jet Engines Work/Part 4: Protection", Dated: Dec. 29, 2021, Retrieved from Internet on Aug. 1, 2023.

Youtube Video Screenshot and Transcript: https://www.youtube.com/watch?v=AdCcbBhondA, "How Jet Engines Work/Part 5: Power", Dated: Feb. 8, 2022, Retrieved from Internet on Aug. 1, 2023.

International Search Report and Written Opinion, PCT/US2023/77198, mailed Mar. 21, 2024, 13 pages.

* cited by examiner

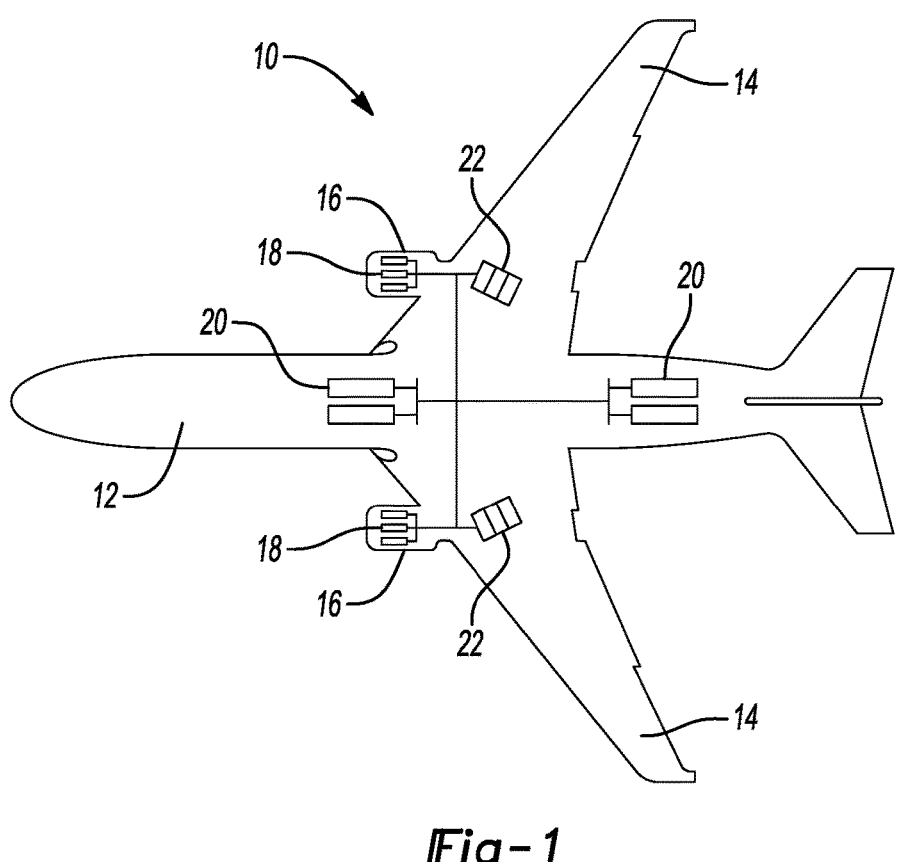
_Fig-1_
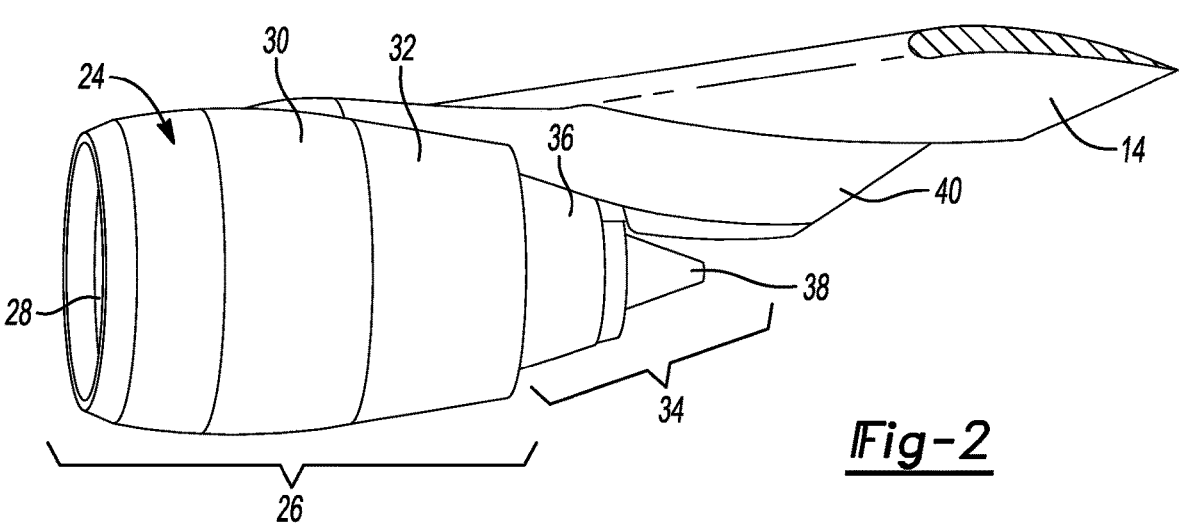
_Fig-2_

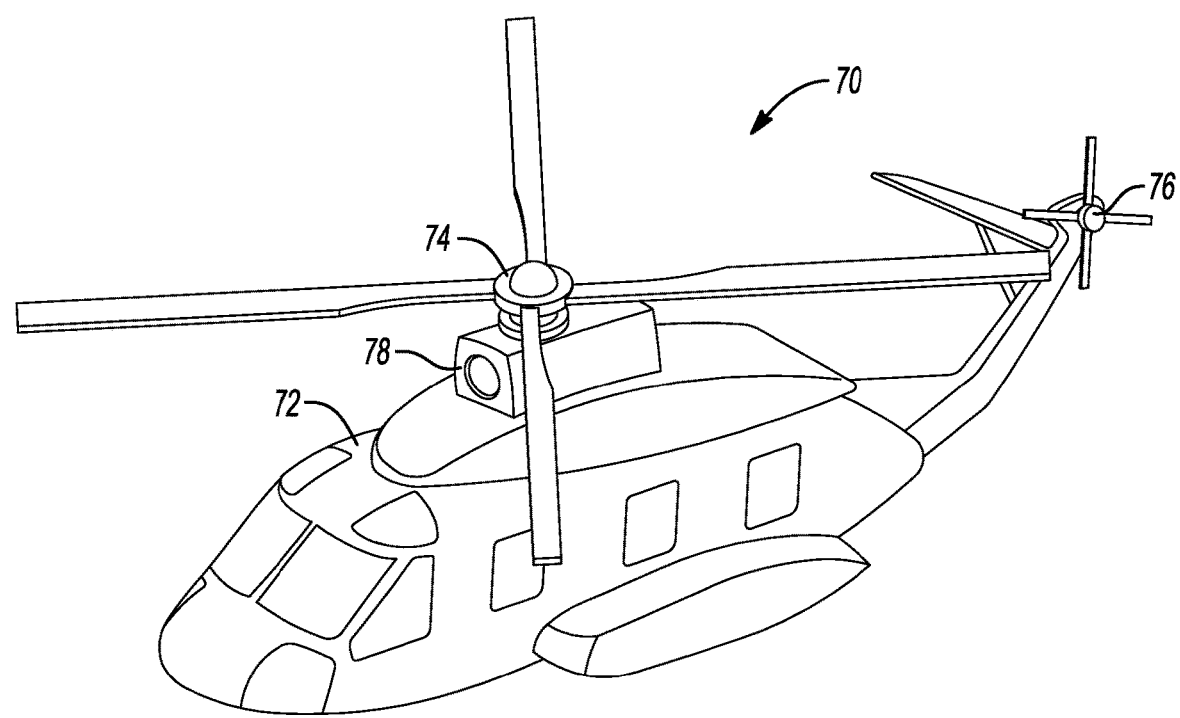
_Fig-7_
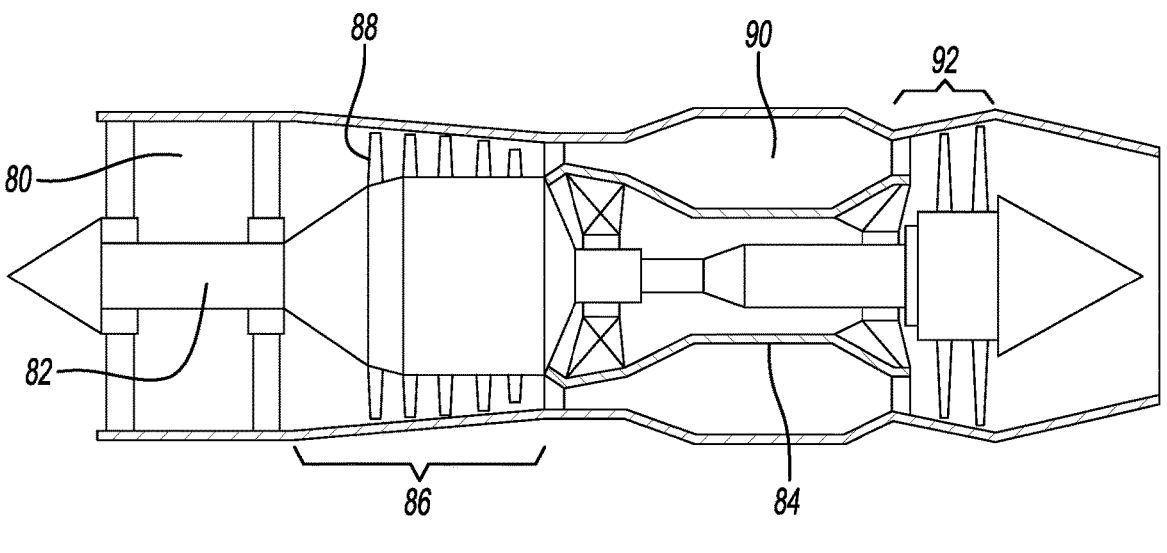
_Fig-8_

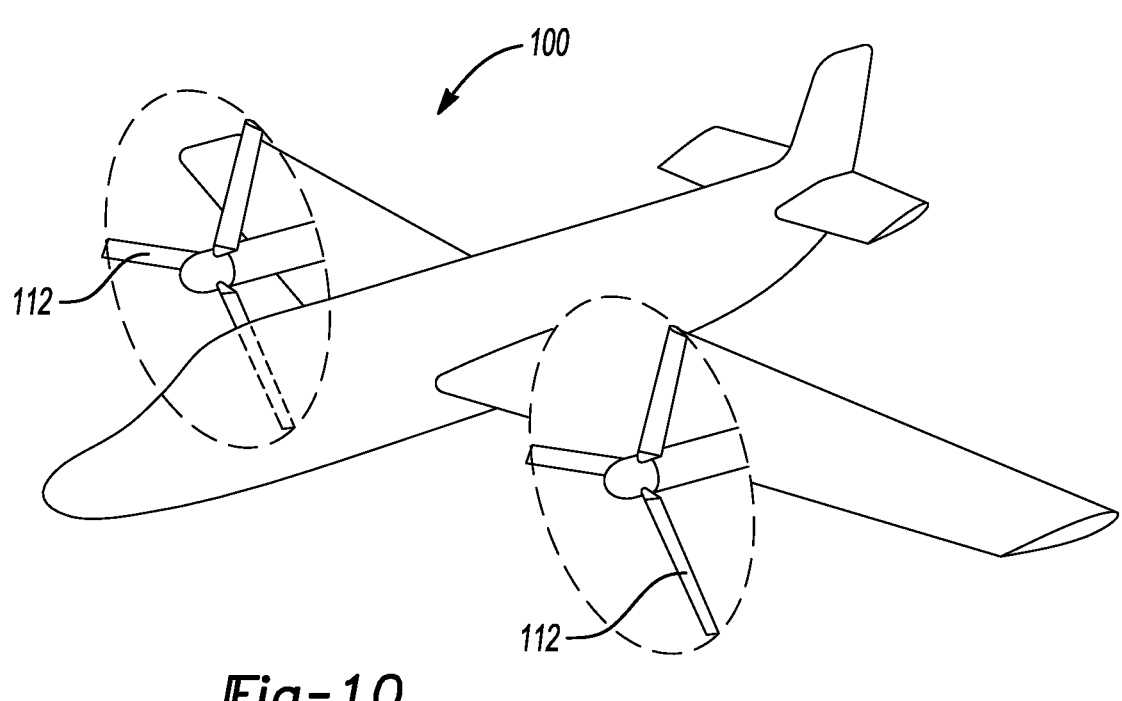
_Fig-10_
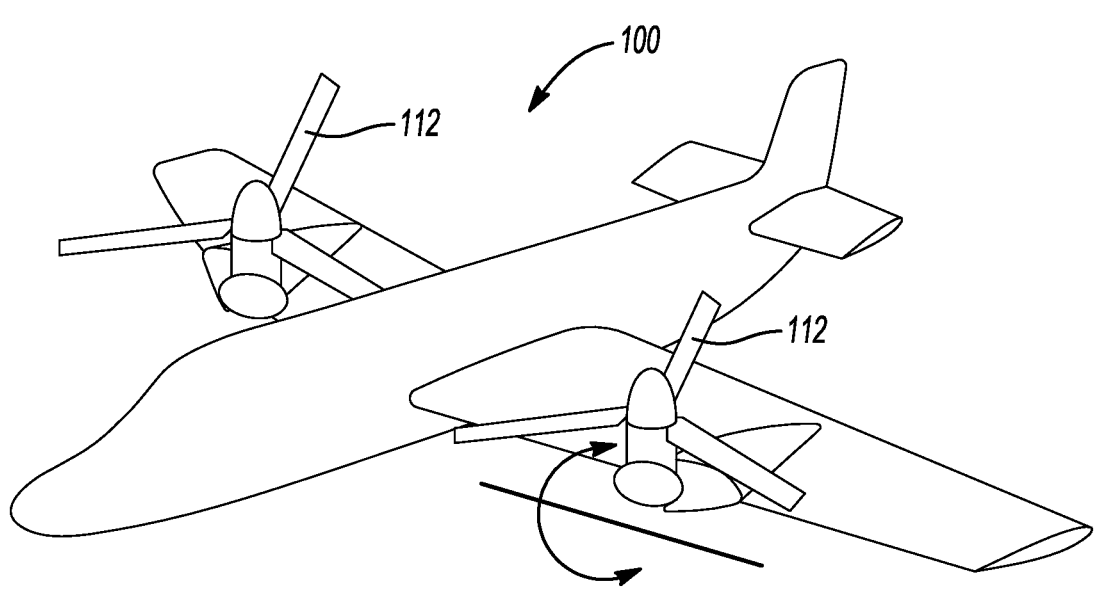
_Fig-11_

HYBRID PROPULSION SYSTEM FOR AIRCRAFT

TECHNICAL FIELD

This disclosure relates to hybrid propulsion systems for airplanes, helicopters, short & vertical take-off and landing vehicles (S/VTOL).

BACKGROUND

Hybrid propulsion systems according to multiple exemplary aspects of the present disclosure combine at least one electrical power generator and at least one motor, and a driving fan/propeller (pusher or puller) in the nacelle for jet engines, including all embodiments of turbofan, turbojet, turboshaft, turboprop, and engines with afterburners for air vehicles. At least one motor drives the propeller or rotor(s) with its nacelle conformally integral with the wing or fuselage for facilitating vertical and short take-off and landing vehicles and helicopters. The exemplary hybrid propulsion system disclosed includes at least one electrical energy storage system located in one or more of the nacelle, wings or fuselage. The propulsion system uses power from both the gas turbine and electric storage system, or solely from electrical storage depending upon the thrust requirements on ground or in the air.

In the present-day aircraft (including fixed wing, vertical and short take off landing or hover crafts) engines, with single or multi spools, the propeller/fan is connected to a low-speed shaft of the jet engine either directly or through a transmission. The term "jet engine" (gas turbine) here refers to turboprop, turbofan and turbojet engine. The speed of rotation of the fan/propeller/rotor is based upon the rotational input from a shaft of the gas turbine engine directly or through mechanical transmission system and is not independently controlled. Hybrid propulsion systems conceptually include dual propulsion systems, one fuel system and one electric system, that are used to propel the vehicle. The architecture of hybrid systems include separate fuel systems and electrical systems. Power to propellers in such hybrid options is provided solely through electrical storage for running isolated electrical motors to turn propellers. An exclusively combined hybrid system as an integral unit is not known to Applicant to be currently in service.

In helicopter propulsion systems, the main rotor and tail rotor are powered by the jet engine through mechanical transmission system involving gear trains. The weight of the driveshaft and transmissions reduces the efficiency of the helicopter resulting in reduced fuel efficiency and vehicle range.

In vertical/short take-off and landing (V/STOL) vehicles, pivotable wing mounted engines generally have a jet engine that is separately located to power an electric motor that drives the propellers. In another concept of the vertical take-off and landing mode the entire propulsion system is pivoted to a vertical orientation with the axis of rotation of the jet engine, electric motor (for solely electric air vehicles), and propeller pivoting together. The entire propulsion system is pivoted to a horizontal orientation for normal flight. Pivoting the entire propulsion system in the case of a conventional turboprop engine requires a substantial supporting structure on the wings of the aircraft that adds weight and reduces efficiency. In another embodiment, the jet exhaust is pivoted for vertical takeoff and landing, with additional thrust vectoring nozzles, with a dedicated system making such a system inefficient.

This disclosure is directed to solving the above problems and other problems as summarized below.

SUMMARY

According to one aspect of this disclosure, a hybrid jet engine conformally integral to wing or fuselage/empennage is disclosed for a fixed wing aircraft. The propulsion system includes an engine housing including a fan compartment/nacelle that houses a low pressure compressor and a fan. A core compartment/nacelle houses a low pressure compressor, a high pressure compressor, a combustion chamber, a high and low pressure turbine section. A low speed spool is connected to the low pressure compressor and the low pressure turbine. A high speed spool is connected to the high pressure compressor and the high pressure turbine. An electric motor is disposed in the fan compartment and is not structurally connected to the low speed spool or the high speed spool. A fan is connected to the electric motor and is disposed in front of the electric motor. A generator is also disposed in the fan compartment, in front of the core compartment and is assembled to the low speed spool. At least one battery is disposed in the fan nacelle that receives current from the generator and provides current to the electric motor.

According to other aspects of this disclosure relating to the hybrid jet engine that may be provided as alternatives or optional features, the at least one battery may include a plurality of batteries assembled in the fan nacelle. At least one backup battery may be disposed in the fuselage and or wing dry bay of the fixed wing aircraft that provides current to the electric motor directly or indirectly. The batteries are interconnected, and the larger battery packs can be used to provide boost in case of additional power requirements. The electric motor may be a brushless electric motor. The electric motor may be disposed in a concentric relationship relative to the generator. Alternatively, the electric motor may be disposed in axially tandem orientation with the generator. The fan rotates at a speed that is controlled by a controller (comprised of inverter/converter and electronic control in collaboration with engine control) and is independent of the low speed spool and of the high speed spool. Fan performance is controlled to match the performance of the core. The fan motor can also be used as generator using appropriate control logic/circuit during certain phases of flight, such as flight and approach idle. A flexible joint may be provided between the generator and its connection to the spools, for architectural reasons.

According to another aspect of this disclosure, a hybrid helicopter is disclosed that includes a fuselage, a main rotor, and a tail rotor. A gas turbine engine has an axis of rotation, and the engine is assembled to the fuselage with the axis of rotation oriented in a longitudinal direction. A generator is driven by the jet engine to charge an energy storage system (e. g. batteries or capacitors) that receives current from the generator. A first electric motor rotates the main rotor and receives current from the energy storage system. A second electric motor rotates the tail rotor and receives current from the energy storage system. In general, the main rotor and the tail rotor are driven by power from the combination of generator and energy storage system directly or indirectly.

According to other aspects of this disclosure relating to the hybrid helicopter that may be provided as alternatives or optional features, the jet engine may have a high speed spool that drives the generator. Alternatively, the jet engine may have a low speed spool, and the generator may be driven by the low speed spool. The fuselage includes a cabin below the main rotor, and the energy storage system (e. g. battery) may be disposed as integral part of the fuselage. The main rotor may be driven directly by the first electric motor with no transmission operatively connected between the first electric motor and the main rotor. The tail rotor may be driven directly by the second electric motor with no transmission operatively connected between the second electric motor and the tail rotor. A speed reduction gear pair may be required for startup sequence.

According to a third aspect of this disclosure, a S/VTOL aircraft is disclosed that includes a fuselage and wings assembled to the fuselage. One or more propulsion systems may be attached to each of the right wing portion and the left wing portion of the S/VTOL aircraft. The S/VTOL propulsion system includes an electric motor and a propeller. At least one energy storage system is disposed in the wing and/or in the fuselage. The electric motors are pivotable relative to the wing with the axis of rotation of the propeller being pivoted between a horizontal orientation and a vertical orientation. A jet engine is assembled in a fixed position on the wing to provide thrust in the forward direction along with the propeller in cruise condition. A generator is rotated by the jet engine and provides current to the energy storage system.

According to other aspects of this disclosure relating to the vertical take-off and landing propulsion system that may be provided as alternatives or optional features, the generator may be disposed in a core nacelle and may be rotated by a high speed spool of the jet engine or a low speed spool of the jet engine. Additionally, a nozzle with thrust vectoring capability is envisioned to assist in aircraft control and S/VTOL configuration. Vectoring thrust nozzles incorporated within the propulsion system is a novel way to assist in S/VTOL aircraft operation, rather than turn the whole propulsion system. This is quite efficient in many ways, compared to the prior configurations.

The above aspects of this disclosure and other aspects will be described below with reference to the attached drawings.

BRIEF DESCRIPTION OF THE DRAWINGS

FIG. 1 is a diagrammatic perspective view of a fixed wing aircraft having jet engines and an energy storage system in accordance with one aspect of this disclosure.

FIG. 2 is a cross-section of a turbofan jet engine in accordance with one aspect of this disclosure.

FIG. 7 is a diagrammatic perspective view of a helicopter having a jet engine in accordance with one aspect of this disclosure.

FIG. 8 is a diagrammatic view of a turbojet engine in a forward propulsion orientation

FIG. 10 is a diagrammatic perspective view of a S/VTOL aircraft with the jet engines in cruise condition FIG. 11 is a diagrammatic perspective view of a S/VTOL aircraft with the jet engines in a vertical takeoff orientation.

DETAILED DESCRIPTION

Figure 3:
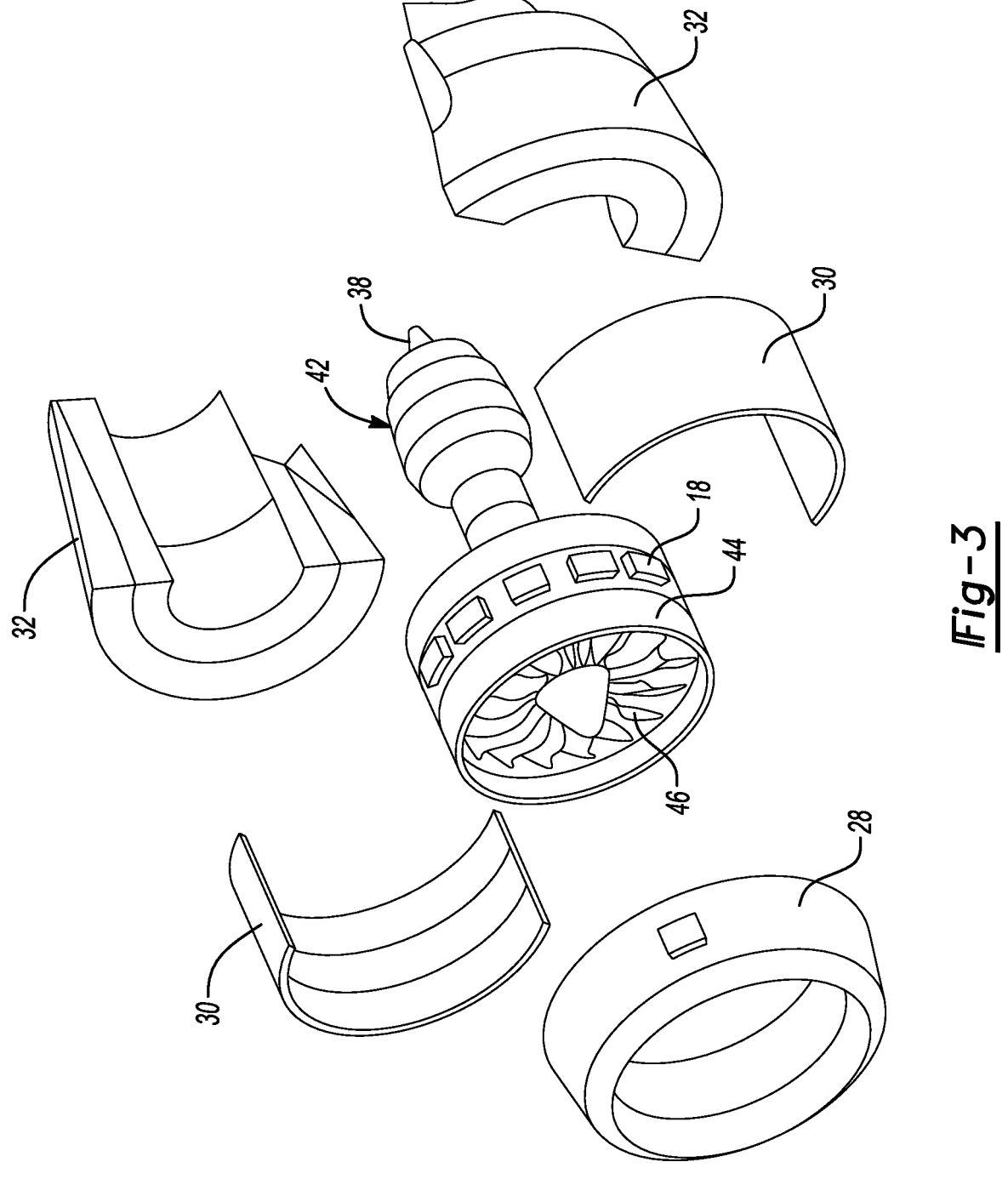
FIG. 3 is an exploded perspective view of a turbofan jet engine in accordance with one aspect of this disclosure.

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Referring to FIG. 1, a fixed wing aircraft 10 is illustrated that includes a fuselage 12 and a pair of wings 14. A propulsion system 16 is assembled to each of the wings 14. The term "jet engine" as used herein refers to a turbofan, turbojet, turboshaft, turboprop, and engines with afterburners. The propulsion system 16 provides propulsion and current to charge fan case battery packs 18, fuselage battery packs 20, and dry bay battery packs 22.

Referring to FIGS. 2 and 3, a turbofan propulsion system 24 for a commercial airplane is illustrated in perspective. A nacelle 26 includes an air inlet cowl 28, a fan cowl 30, and a core and thrust reverser cowl 32. The exhaust system 34 includes a fan exhaust nozzle 36 and a core exhaust nozzle 36 and a plug 38. A pylon 40 attaches the turbofan propulsion system 24 to the wing 14.

Referring to FIG. 3, the air inlet cowl 28, fan cowl 30, and core and thrust reverser cowl 32 are shown separated from a jet engine core 42. A fan case 44 encloses a fan 46 and is enclosed by the fan cowl 30. In one exemplary embodiment, the electric motor is a brushless electric motor. The fan 46 is driven by an electric motor 48 (shown in FIGS. 4-6) that is independent from the jet engine core 42. The term "independent" as used herein means that the jet engine core 42 does not provide mechanical torque to the fan 46.

Fan case battery packs 18 provide current to the fan 46 and are assembled to the fan case 44. By powering the fan 46 from the fan case battery packs 18 power is conserved because the mass of the aircraft can be reduced because the wiring for the electric motor 48 can be of reduced mass. The current provided to the electric motor 48 may, alternatively or in combination, be provided by a generator 52 (shown in FIGS. 4-6), the fuselage battery packs 20 or the dry bay battery packs 22. An electronic engine controller 54, responsive to the propulsion requirements of the jet engine, selectively provides current to the electric motor 48 from one or more of the fan case battery packs 18, the generator 52, the fuselage battery packs 20, or the dry bay battery packs 22.

Figure 4:
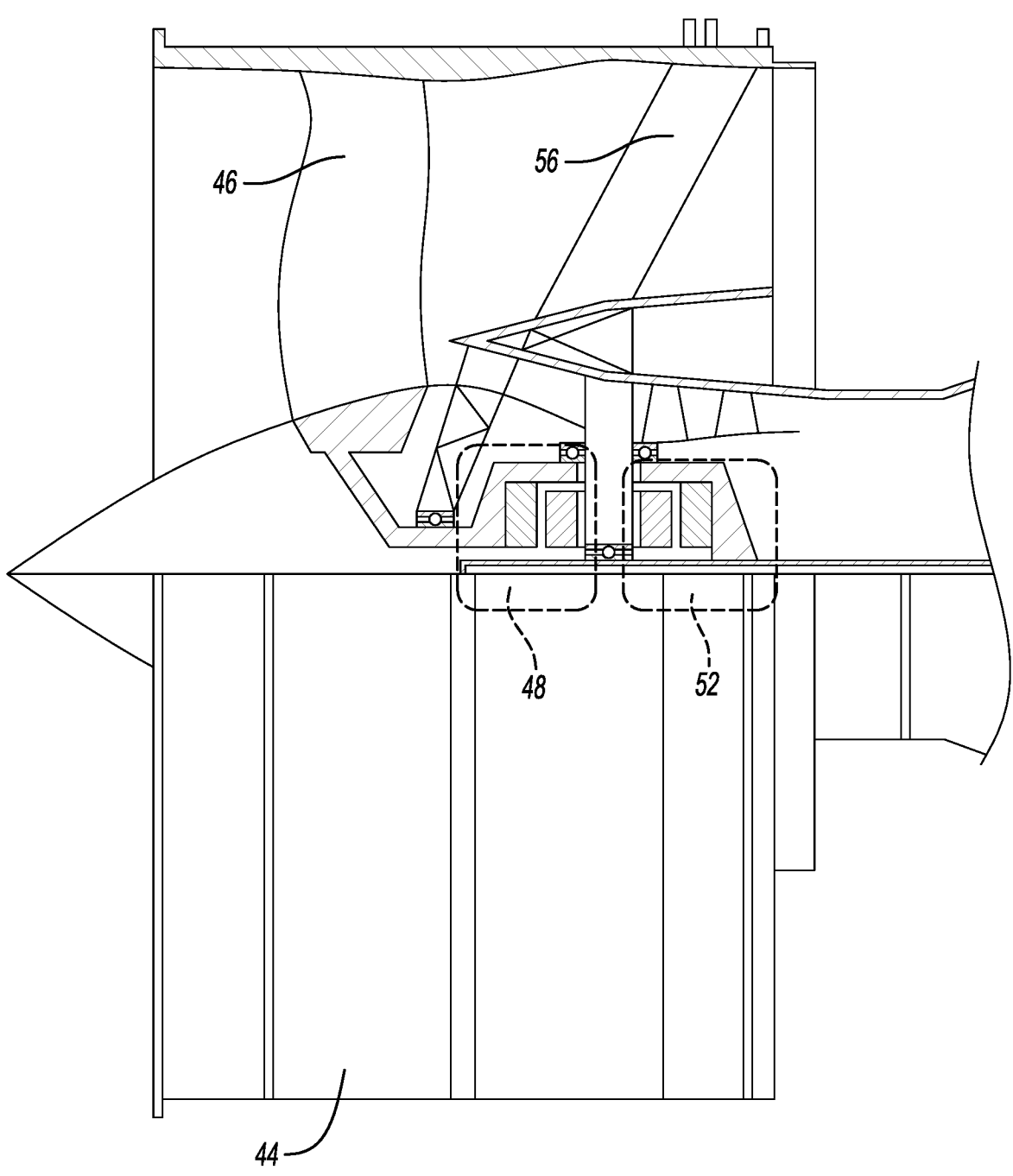
FIG. 4 is a fragmentary partial cross-section view of a turbofan jet engine in accordance with one aspect of this disclosure with the electric motor disposed in an axially tandem orientation with the generator.

Referring to FIG. 4, a partially cut-away fragmentary enlarged view of the fan case 44, fan 46 are shown with a fan frame 56, the generator 52, and the electric motor 48. In the illustrated embodiment, the motor 48 and generator 52 are assembled to the fan frame 56 in axial alignment with the central axis of the jet engine core 42 with the electric motor 48 in front of the generator 52. The fan frame 56 supports bearings 58 that, in turn, support the fan 46, the motor 48, and the generator 52 for relative rotation. The generator 52 is rotated by the jet engine core 42 to produce current to charge the fan case battery packs 18, the fuselage battery packs 20, or the dry bay battery packs 22. The generator 52 may also provide current to the motor 48 directly.

Figure 5:
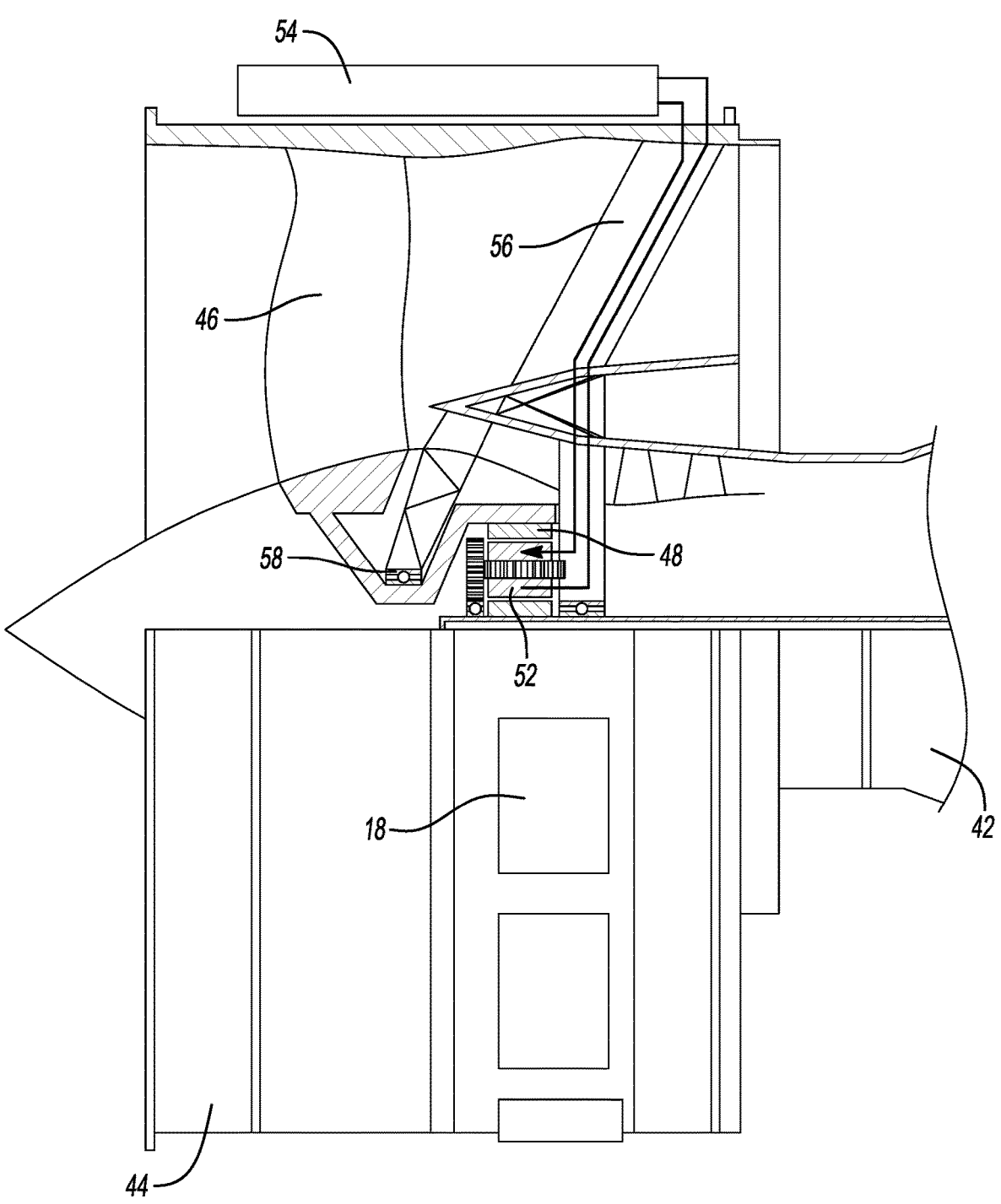
FIG. 5 is a fragmentary partial cross-section view of a turbofan jet engine in accordance with one aspect of this disclosure with the electric motor and the generator disposed in a concentric relationship relative to the generator.
Figure 6:
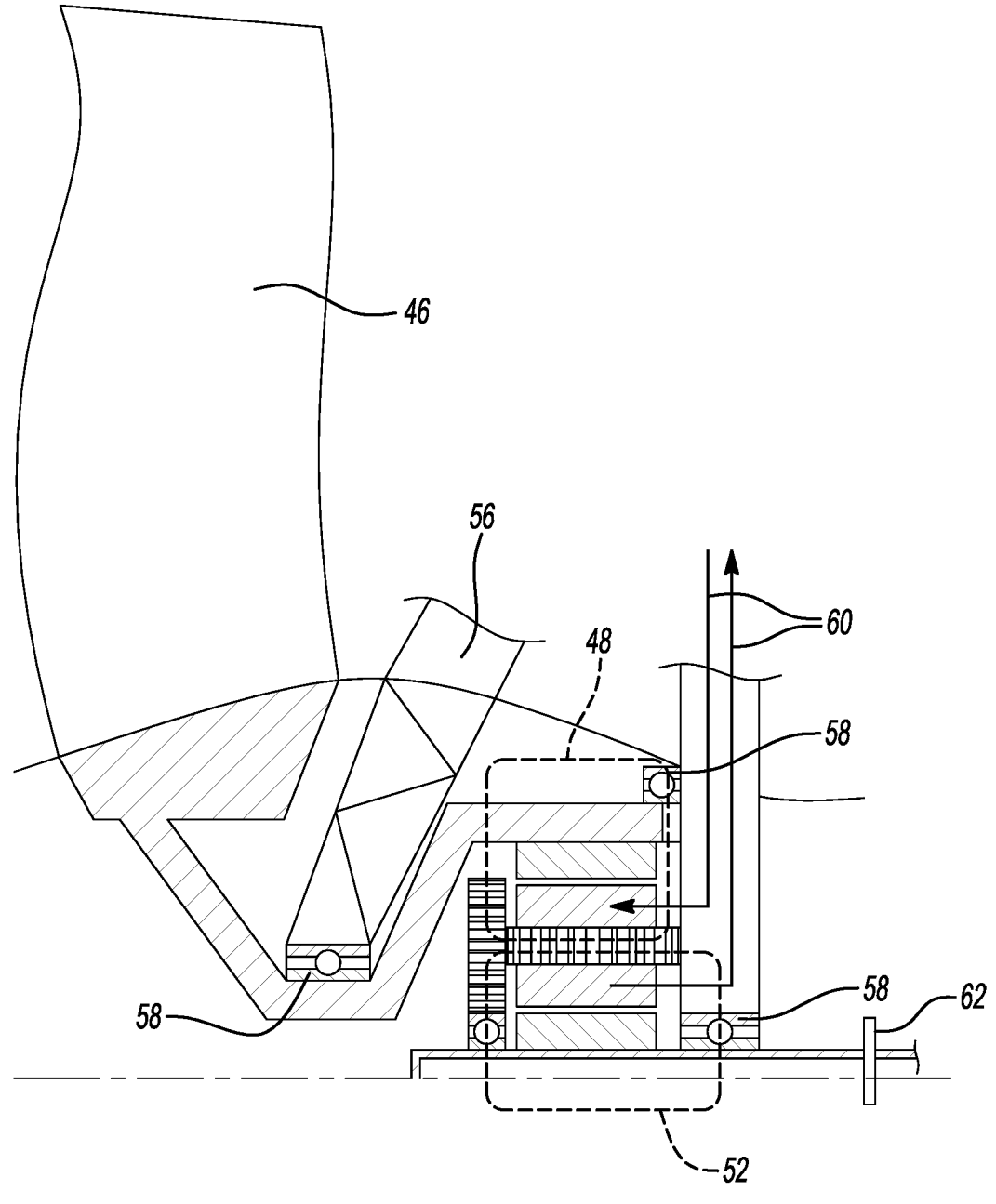
FIG. 6 is a fragmentary partial cross-section view of the turbofan jet engine of FIG. 5.

Referring to FIGS. 5 and 6, an alternative arrangement is illustrated with a partially cut-away fragmentary enlarged view of the fan case 44, fan 46 are shown with a fan frame 56, the generator 52, and the electric motor 48. In the illustrated embodiment, the motor 48 and generator 52 are assembled to the fan frame 56 concentrically with each other and have a common axis of rotation with the electric motor 48 surrounding the generator 52. The fan frame 56 supports bearings 58 that support the fan 46, the motor 48, and the generator 52 for relative rotation. The generator 52 is rotated by the jet engine core 42 to produce current to charge the fan case battery packs 18, the generator 52, the fuselage battery packs 20, or the dry bay battery packs 22.

In both the embodiments of FIG. 4 and of FIGS. 5 and 6, The electric motor 48 is not driven by the jet engine core and does not receive any torque from the jet engine core 42. Signal and power cables 60 (wiring) are routed through the fan frame 56 between the electronic engine controller 54 (controller/inverter), the battery packs (18, 20, and 22) and the generator 52. A flexible joint 62 is provided between generator 52 and the jet engine core 42 to absorb vibration and mitigate differential displacement from the jet engine core 42, should the architecture demand.

Referring to FIG. 7, a helicopter 70 is illustrated that includes a fuselage 72, a main rotor 74, a tail rotor 76, and a jet engine 16 having an axis of rotation oriented in a longitudinal direction.

Referring to FIG. 8, a turbojet engine 78 is illustrated in cross-section. The turbojet engine 78 does not include a fan and is an example of a propulsion system 16 that may be included in the helicopter embodiment (FIGS. 7-9) or vertical/short take-off and landing (V/STOL) vehicles (FIGS. 10-19). The turbojet engine 78 includes an inlet 80 that houses a generator 82 that is integral with the jet engine core 84. The engine core 84 includes a compressor section 86 having a selected number of compressor blades 88. A combustion chamber 90 is disposed behind the compressor 86. A turbine section 92 receives exhaust from the combustion chamber 90 that is expelled from the turbojet engine 78. The generator 82 is connected to one of the jet engine core s (not shown) and rotates with the jet engine core that provides torque to rotate the generator 82.

Current is provided by the generator to the battery pack 22 described above with reference to the embodiments of FIGS. 4-6. However, the generator 82 does not provide current to any fan case battery packs 50 nor to any dry bay battery packs 22. The fuselage battery packs 20 provide current to the main rotor 74 and tail rotor 76 of the helicopter 70. In a V/STOL vehicle 100 the generator 82 provides current to either or both of the fuselage battery packs 20 and dry bay battery pack 22.

Figure 9:
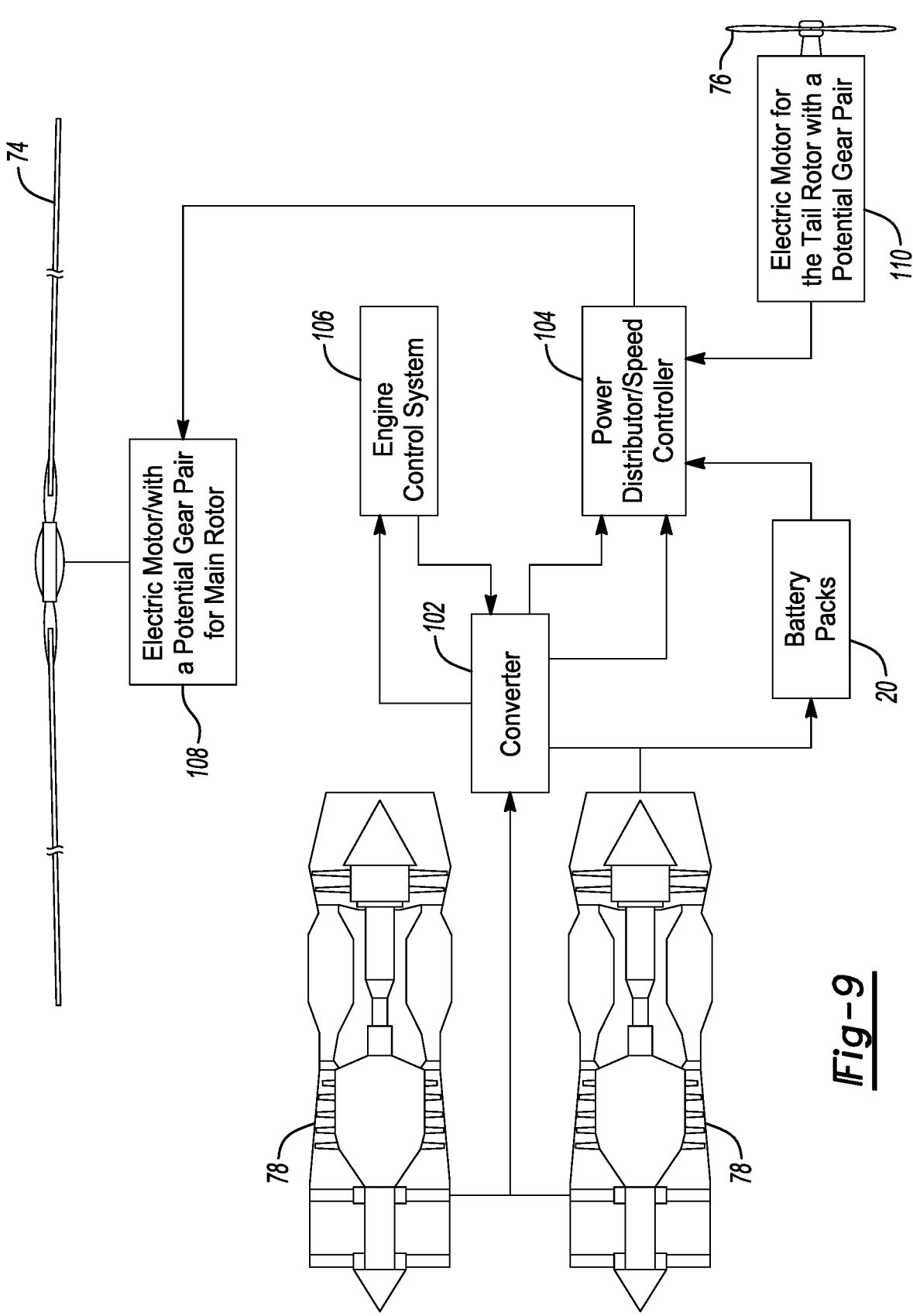
FIG. 9 is a diagram of a control system for a helicopter in accordance with one aspect of this disclosure.

Referring to FIG. 9, a flow chart illustrates one example of the drive and control systems of the helicopter 70. Two turbojet engines 78 that include an integral generator 82 provide current to an AC/DC converter 102 that converts the AC current to DC current to charge the fuselage battery pack 20. The fuselage battery packs 20 provide current to a power distributor and speed controller 104. An engine control system 106 responsive to the propulsion requirements and stabilization requirements of the helicopter 70 controls the power distributor and speed controller 104. Current is provided to a main rotor electric motor 108 that rotates the main rotor and to a tail rotor electric motor 110 that rotates the tail rotor 76. Engine control system 106 communicates with the power distributor and speed controller 104 to control the amount of current provided to the electric motors 108 and 110 and speed of rotation of the main rotor 74 and the tail rotor 76.

Referring to FIGS. 10 and 11, the V/STOL vehicle 100 is illustrated in two different operational modes. The V/STOL vehicle 100 includes two turboprop engines 112 In FIG. 10, the V/STOL vehicle 100 is in a flying position with the axis of rotation of the propeller 114 oriented in a horizontal orientation to provide thrust in a forward direction. In FIG. 11, the V/STOL is a take-off or a landing position wherein the axis of rotation of the propeller is oriented vertically to provide lift in a vertical direction. As used herein the term "horizontal" is a relative term in that the aircraft climbs and turns and is not always strictly horizontal. The term "vertical" is a relative term in that the aircraft may move partially in the horizontal direction during take-off and landing.

Figures 12, 13:
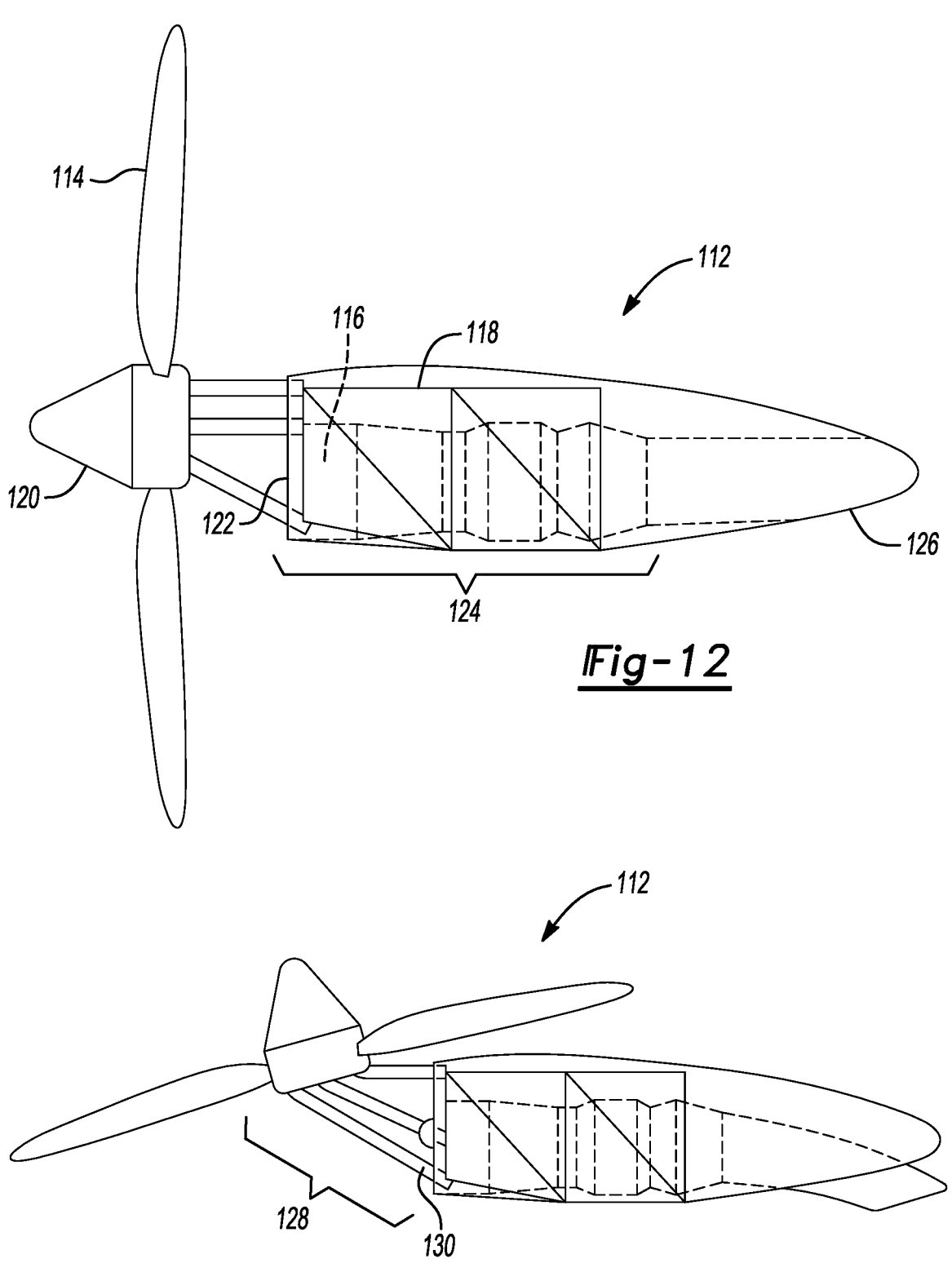
FIG. 12 is a fragmentary diagrammatic perspective view of a S/VTOL aircraft jet engine in a forward propulsion orientation.
FIG. 13 is a diagrammatic view of a turboprop jet engine with the propeller moved to a vertical takeoff orientation.

Referring to FIGS. 12 and 13, the turboprop engine 112 is illustrated in FIG. 12 with the axis of rotation of the propeller 114 oriented in a horizontal direction to provide thrust in a forward direction. The propeller 114 in FIG. 13 is oriented in a take-off or a landing position wherein the axis of rotation of the propeller is oriented vertically along with the vector controlled exhaust nozzle 126. This is achieved at the aircraft level with engine and aircraft control system coordination.

The turboprop engines 112 each include a brushless generator 116 that is disposed in an engine mount and support structure 118 and is housed in a turboprop nacelle. The propeller includes a pitch control mechanism (not shown) that is provided in combination with a brushless motor 120. The turboprop engine 112 receives air through an inlet 122, through a compressor gas turbine section 124, and to the exhaust nozzle 126. The compressor gas turbine section 124 may be an axial flow or centrifugal flow type of turbine. The motor 120 and propeller 114 are attached to the turboprop engine 112 by an articulating linkage 128 that is more fully described below with reference to FIGS. 13-20.

Referring to FIG. 13, the turboprop engine 112 is shown with the motor and pitch control systems rotated to the take-off and landing vertical thrust position by the articulating linkage 128. The structure of the articulating linkage 128 may be altered with two embodiments being shown and described with reference to FIGS. 14 and 15.

Figures 14, 15, 16:
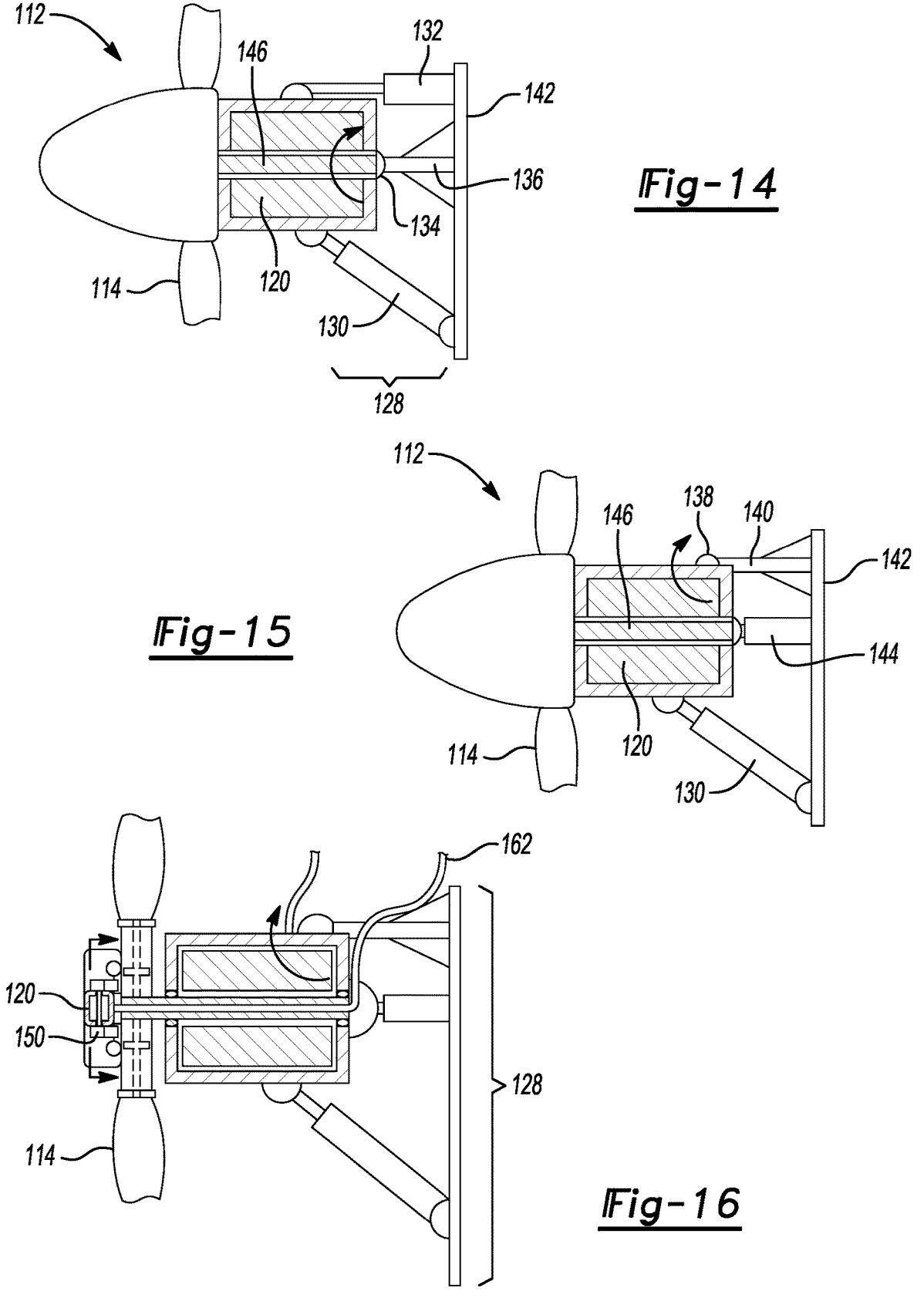
FIG. 14 is a diagrammatic view of a turboprop jet engine with a motor frame supported at the front spar of the wing that includes a hinge at an upper location.
FIG. 15 is a diagrammatic view of a turboprop jet engine with a motor frame supported at the front spar of the wing that includes a hinge at an intermediate location.
FIG. 16 is a diagrammatic view of a turboprop jet engine with a motor frame supported at the front spar of the wing that includes a hinge at an upper location and a pitch control structure.

Referring to FIG. 14, an intermediate hinge configuration is shown in greater detail wherein the articulating linkage 128 includes a lower linear actuator 130, an upper linear actuator 132 and an intermediate hinge 134 that is supported by a stationary bracket 136 and is disposed between the lower linear actuator 130 and the upper linear actuator 132. The support bracket and the actuation system are supported at the wing front spar and engine mount support structure 142. The lower linear actuator 130 is extended and the upper linear actuator 132 is retracted to move the motor 120 and propeller 114 from the horizontal orientation to the vertical orientation for take-off and landing. The lower linear actuator 130 is retracted and the upper linear actuator 132 is extended to move the motor and propeller from the vertical orientation to the horizontal orientation for flight. The propeller and brushless motor 120 pivot about the intermediate hinge 134.

Referring to FIG. 15, a high hinge configuration is shown to include an upper hinge 138 that is supported by a bracket 140 attached to the wing front spar and engine mount support structure 142. An intermediate linear actuator 144 and the lower linear actuator 130 are extended to move the motor 120 and propeller 114 from the horizontal orientation to the vertical orientation for take-off and landing. The intermediate linear actuator 144 and the lower linear actuator 130 are retracted from the vertical orientation to the horizontal orientation for flight. A hollow propeller shaft 146 is received in the brushless motor 120 and is aligned with the intermediate linear actuator 144. The shaft 146 is such that it permits control/power cables 162 for pitch control mechanism shown in FIG. 16 to pass through.

Figures 17, 18, 19:
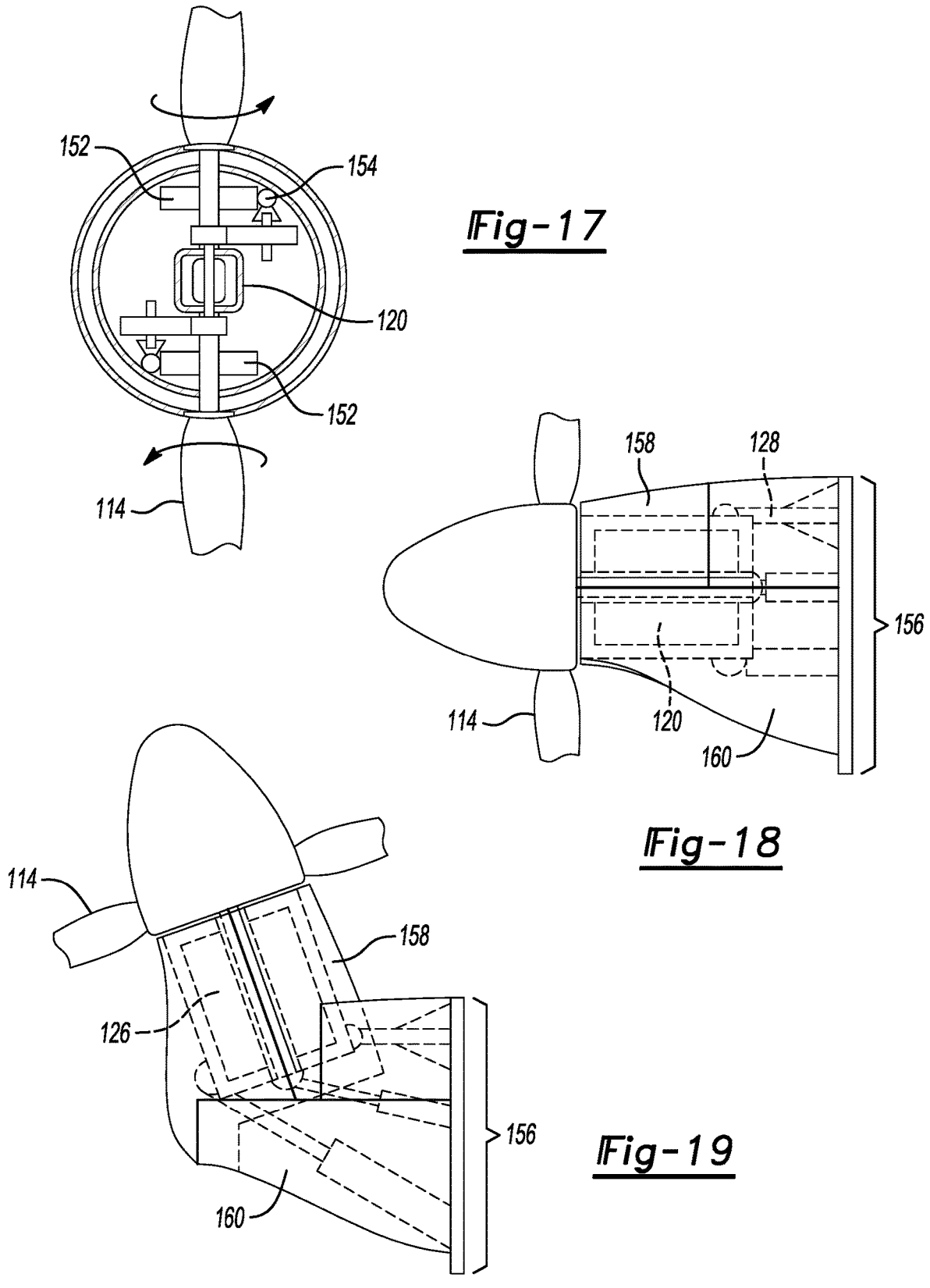
FIG. 17 is a diagrammatic view of a turboprop jet engine with the pitch control structure shown in FIG. 16.
FIG. 18 is a diagrammatic view of a turboprop jet engine that includes a split front faring in a forward propulsion orientation.
FIG. 19 is a diagrammatic view of a turboprop jet engine that includes a split front faring in a take-off and landing orientation.

Referring to FIGS. 16 and 17, the articulated linkage 128 is shown with the motor and a pitch control linkage 150. The pitch control linkage 150 includes the motor 120 with a spur/bevel gear 152 and worm gear pairs 154. The spur gears 152 rotate the propellers 114 for pitch control. FIG. 17 is a cross-section showing the motor 120 and pitch control linkage 150. A linkage for a two propeller system is shown but additional propellers may be added with additional linkages. This embodiment shows a concept of the pitch control mechanism using an electromechanical arrangement, however other means of pitch control mechanisms can be adopted and should be obvious to the skilled in the art.

Referring to FIGS. 18 and 19, A split faring 156 is shown that includes a top faring 158 and a bottom faring 160. The articulated linkage 128 is shown to be enclosed in the split faring 156 and is used to move the motor 120 and propeller 114 from the horizontal orientation to the vertical orientation for take-off and landing. The propeller 114 and motor 120 are shown in the cruise flight orientation in FIG. 18 and are shown in the take-off and landing position in FIG. 19.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and includes modifications of the illustrated embodiments.

What is claimed is:

1. A hybrid propulsion system for a fixed wing aircraft comprising:

a nacelle which houses a jet engine core comprises a fan cowl and a core cowl;

a fan case is present within and is spaced apart from the fan cowl, thereby defining a battery space, wherein the fan case houses a fan operatively independent of the jet engine core;

wherein the jet engine core includes a low-pressure compressor section, a high-pressure compressor section, a combustion chamber, a high-pressure turbine section, and a low-pressure turbine section;

an electric motor disposed within the fan case, upstream of the jet engine core, wherein operation of the electric motor is mechanically independent from the jet engine core, and the fan is rotatably connected to the electric motor to be driven by the electric motor;

a generator rotatably coupled to the jet engine core;

a battery is disposed on an exterior surface of the fan case in the battery space, the battery is operatively connected to the fan to provide power thereto, is operatively connected to the generator to receive current therefrom, and is operatively connected to the electric motor to provide power thereto; and an electronic engine controller is operatively connected to the electric motor, the electronic controller configured to operate the system selectively to provide power from the battery and/or the generator to the electric motor to drive the fan.

2. The hybrid propulsion system of claim 1, wherein the battery includes a plurality of batteries connected by wiring that provides current to the electric motor, a fan frame mounts the fan within the fan case, and the wiring is supported within the fan frame.

3. The hybrid propulsion system of claim 2, wherein the electric motor is disposed in axial alignment with the generator, with the electric motor being disposed in the fan case in front of the fan frame and the generator is disposed behind the fan frame.

4. The hybrid propulsion system of claim 1, further comprising a backup battery disposed in fuselage of the fixed wing aircraft and operatively connected to the battery disposed on the fan case.

5. The hybrid propulsion system of claim 4, wherein the backup battery is operatively connected to the generator to be charged thereby.

6. The hybrid propulsion system of claim 1, further comprising a backup battery disposed in a dry bay of a wing of the fixed wing aircraft and operatively connected to the battery disposed on the fan case.

7. The hybrid propulsion system of claim 6, wherein the backup battery is operatively connected to the generator to be charged thereby.

8. The hybrid propulsion system of claim 1, wherein the electric motor is disposed concentrically around the generator.

9. The hybrid propulsion system of claim 1, wherein the jet engine core is selected from the group consisting of one a turbofan engine;

a turboshaft engine;

a turboprop jet engine;

a turbojet engine; and a jet engine having an afterburner.

10. The hybrid propulsion system of claim 1, wherein the low-pressure compressor has a shaft operatively connected to the generator, and the system further comprises a flexible joint between the low speed spool and the generator.

11. A hybrid propulsion system for a fixed wing aircraft comprising:

a nacelle which houses a gas turbine having a shaft connected to a low pressure compressor;

a fan case within the nacelle, wherein the fan case houses a fan;

an electric motor disposed within the fan case, upstream of the gas turbine, wherein operation of the electric motor is mechanically independent of the gas turbine, and the fan is rotatably connected to the electric motor;

a generator is rotatably coupled to the shaft of the gas turbine and is disposed in the fan case upstream of the gas turbine;

a battery is disposed on the fan case in a space defined between a fan cowl and the fan case and is operatively connected to receive current from the generator and operatively connected to the electric motor to provide power thereto;

a controller is operatively connected to the electric motor to selectively provide current to the electric motor from one or more of the battery and the generator and operatively control a speed at which the fan rotates; and a flexible joint between the shaft of the gas turbine and the generator, wherein the flexible joint is configured to absorb vibration and mitigate differential displacement from the gas turbine.

12. The hybrid propulsion system of claim 11, wherein the battery includes a plurality of batteries connected by wiring that provides current to the electric motor, a fan frame mounts the fan within the fan case, and the wiring is supported within the fan frame.

13. The hybrid propulsion system of claim 11, wherein the electric motor is disposed concentrically around the generator or the electric motor is disposed in axial alignment with the generator.

14. The hybrid propulsion system of claim 11, wherein the electric motor is disposed in the axial alignment with the generator, and the electric motor is disposed in the fan case in front of the fan frame and the generator is disposed behind the fan frame.

15. The hybrid propulsion system of claim 11, further comprising a backup battery disposed in a fuselage or in a dry bay of a wing of the fixed wing aircraft and operatively connected to the battery disposed on the fan case.

16. The hybrid propulsion system of claim 15, wherein the backup battery is operatively connected to the generator to be charged thereby.

17. The hybrid propulsion system of claim 11, wherein the gas turbine and the electric motor are independently operable and the electric motor is operable to power the fan.

18. A hybrid propulsion system for a fixed wing aircraft comprising:

a nacelle which houses a gas turbine having a shaft connected to a low-pressure compressor;

a fan case within the nacelle, wherein the fan case houses a fan;

an electric motor disposed within the fan case, upstream of the gas turbine, wherein operation of the electric motor is mechanically independent of the gas turbine, and the fan is rotatably connected to the electric motor; wherein the electric motor is disposed concentrically around the generator;

a battery is disposed on the fan case in a space defined between a fan cowl and the fan case and is operatively connected to receive current from the generator and operatively connected to the electric motor to provide power thereto;

a generator is rotatably coupled to the shaft of the gas turbine and is disposed in the fan case upstream of the gas turbine;

a controller operatively connected to the electric motor to selectively provide current to the electric motor from one or more of the battery and/or the generator to selectively operate the fan; and a backup battery disposed in a fuselage or in a dry bay of a wing of the fixed wing aircraft and operatively connected to the battery disposed on the fan case or to the electric motor.

19. The hybrid propulsion system of claim 18, wherein the backup battery is operatively connected to the generator to be charged thereby.

20. The hybrid propulsion system of claim 18, wherein the gas turbine and the electric motor are independently operable and the electric motor is operable to power the fan.

21. The hybrid propulsion system of claim 18, wherein the battery includes a plurality of batteries connected by wiring that provides current to the electric motor, a fan frame mounts the fan within the fan case, and the wiring is supported within the fan frame.

22. The hybrid propulsion system of claim 18, wherein the low-pressure compressor has a shaft operatively connected to the generator, and the system further comprises a flexible joint between a shaft of the gas turbine and the generator.

23. The hybrid system of claim 18, wherein fan case comprises a fan frame therein and the fan frame supports bearings that support the fan, the electric motor, and the generator for relative rotation.

* * * * *